Figure 1:
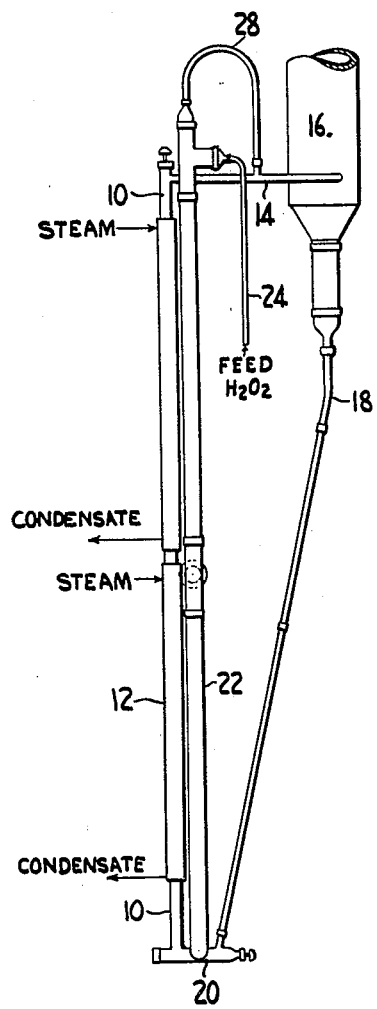

Nov. 15, 1960  W. S. STRAUB ET AL  2,960,448
TREATMENT OF HYDROGEN PEROXIDE
Filed May 23, 1958

INVENTORS
WILLIAM S. STRAUB and
CHARLES J. SINDLINGER
BY
Oscar L. Spencer
ATTORNEY

United States Patent Office 2,960,448
Patented Nov. 15, 1960

2,960,448

TREATMENT OF HYDROGEN PEROXIDE

William S. Straub, Akron, Ohio, and Charles J. Sindlinger, Corpus Christi, Tex., assignors to Columbia-Southern Chemical Corporation, Allegheny County, Pa., a corporation of Delaware Filed May 23, 1958, Ser. No. 737,292

12 Claims. (Cl. 202—56)

This invention relates to a method of vaporizing hydrogen peroxide. Hydrogen peroxide commonly is produced in the form of a relatively dilute solution or a relatively impure solution, depending upon the method of preparation. The more modern processes of producing hydrogen peroxide involve oxidation and reduction of certain organic compounds, such as 2-ethyl anthraquinone, followed by extraction of the resulting hydrogen peroxide with water. The resulting hydrogen peroxide solution may contain up to about 50 percent by weight of hydrogen peroxide although, frequently, the solution is much more dilute and contains in the range of 10 to 30 percent by weight of hydrogen peroxide. This solution usually is contaminated with carbonaceous impurities which include traces of the solvent or organic compound used for the production of hydrogen peroxide and/or degradation products thereof.

The solution may be concentrated and/or purified by vaporizing a portion of the hydrogen peroxide and removing the vapors from the unvaporized liquid residue. These vapors are then subjected to rectification and/or condensation in order to recover a purified hydrogen peroxide solution, usually containing in excess of 30 percent by weight of hydrogen peroxide. The liquid residue is highly contaminated with the carbonaceous impurities and normally contains in excess of about 40 percent (usually 60 to 70 percent or more) by weight of hydrogen peroxide.

Purification and/or concentration according to this method is hazardous. The presence of the carbonaceous impurities in large amount renders the hydrogen peroxide explosive at certain concentrations, for example, about 70 percent $H_2O_2$. Thus, the hydrogen peroxide liquid residue formed in the course of the vaporization exhibits a serious tendency to explode, and the explosion can be so severe as to completely destroy the distillation equipment and may actually be hazardous to life.

According to the present invention, a method has been provided whereby hydrogen peroxide containing such carbonaceous impurities may be vaporized safely and with substantially less danger of explosion. In the practice of this process, an aqueous hydrogen peroxide solution containing the carbonaceous impurities mentioned above is heated in a vaporizer to partially vaporize the solution and thereby form a mixture of vapor and unvaporized liquid residue. Usually less than 50 percent, and normally less than 20 percent, by volume of the solution is vaporized in a single pass of the solution through the vaporizer. The resulting mixture of vapors and unvaporized liquid hydrogen peroxide solution is carried upward in the vaporizer by the rising vapors and is discharged from the upper portion of the vaporizer while at the same time a body of unvaporized hydrogen peroxide solution is maintained in the lower portion of the vaporizer. The mixture thus discharged is delivered to a separator where the vapor is separated from unvaporized hydrogen peroxide and the unvaporized hydrogen peroxide solution is then delivered to the body of hydrogen peroxide solution in the vaporizer, usually at a point below that at which the vapors are formed in the vaporizer.

Thus, a cycle is established wherein hydrogen peroxide solution circulates upwardly through the vaporizer into the separator and back into the bottom of the vaporizer. As a consequence, a relatively concentrated hydrogen peroxide solution containing in the range of about 55 to 70 percent by weight of hydrogen peroxide is established in the circulating system. Hydrogen peroxide feed solution to be vaporized is supplied to the body of liquid in the bottom of the vaporizer continuously, and, in order to avoid excessive concentration of carbon in the circulating body of liquid, a quantity of liquid hydrogen peroxide is purged from the body of liquid returning to the vaporizer either continuously or from time to time.

In the operation of the process as indicated above, there is serious danger that the hydrogen peroxide solution may rise in concentration above that at which the explosive hazard mentioned above is created. Where the carbon concentration is high, any concentration above 70 percent $H_2O_2$ by weight is hazardous. If the concentration of carbon is low, on the other hand, higher $H_2O_2$ concentrations can be safely reached. Undue concentration of the solution can occur inadvertently for a number of reasons.

In the first place, the rate of heat input into the vaporizer may be so fast as to cause vaporization of the solution at a rate faster than the feed is supplied. Secondly, stoppage can occur in the hydrogen peroxide feed lines coming from the hydrogen peroxide tanks, of which the operator may be unaware. In either case, the hydrogen peroxide continues to circulate in the vaporizer-separator loop, becoming more and more concentrated as vapor is removed.

According to this invention, the likelihood of this hazard taking place is eliminated or at least substantially minimized by providing a reservoir or pool of dilute hydrogen peroxide in direct and unobstructed communication with the body of solution in the bottom of the vaporizer at a point below the point at which the vapors are formed in the vaporizer. Thus, the hydrogen peroxide feed is delivered from the pool or reservoir at a point well below that at which the vapors are heated and, furthermore, the level of the pool in the reservoir is maintained substantially equal in height to that of the body of liquid in the vaporizer while the weight of liquid in the pool or reservoir is maintained at least five times the weight of liquid in the vaporizer (which, of course, includes any portion of said body extending into the return line coming from the separator).

As a consequence, whenever feed of hydrogen peroxide to the reservoir should be discontinued, the level of the liquid in the reservoir gradually falls but always is present in amount sufficient to dilute the body of hydrogen peroxide solution established in the vaporizer below 70 percent by weight. This dilution is inevitable and inherent because of the greater volume of solution in the reservoir than in the vaporizer. Consequently, so long as the concentration of the hydrogen peroxide supplied to the reservoir is less than the concentration of hydrogen peroxide solution produced after vaporization of a portion of the hydrogen peroxide and water therefrom, the dilution will inevitably occur by the hydrogen peroxide coming from the reservoir, thereby maintaining the hydrogen peroxide solution below the explosive concentration even though vaporization continues to occur and the level of liquids in the reservoir and the vaporizer continues to fall.

As vaporization is continued in such a system, a stage is finally reached when the amount of vapors formed in the vaporizer will not be great enough in volume to carry hydrogen peroxide liquid solution into the separator. Even in that case, dilute hydrogen peroxide solution continues to flow from the reservoir, thus preventing concentrations of the solution in the vaporizer beyond the safe limit. However, it often occurs that the level of the hydrogen peroxide in the vaporizer rises and falls, creating a pulsation in the bottom of the vaporizer which communicates itself into the reservoir, thereby causing an appreciable mixing of the hydrogen peroxide in the reservoir with the hydrogen peroxide in the vaporizer. This mixing also promotes dilution of the hydrogen peroxide in the vaporizer system below the explosive concentration although the process herein contemplated will function effectively even without such back mixing.

Figure 2:
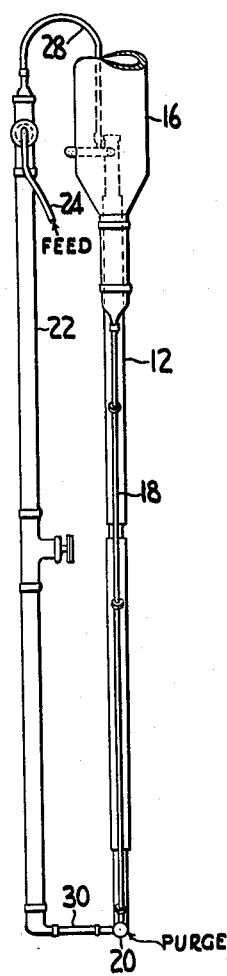

The invention will be more clearly understood by reference to the ensuing disclosure and the accompanying drawing of a typical embodiment thereof, in which:

Fig. 1 is a diagrammatic front elevation of a typical apparatus which is used in the performance of the invention herein contemplated and which constitutes an embodiment thereof; and Fig. 2 is a diagrammatic side elevational view of the apparatus illustrated in Fig. 1.

As shown in the drawing, there is illustrated a vaporizer tube 10 enclosed in steam jackets 12 which terminate a substantial distance above the lower end of the vaporizer tube. The vaporizer tube is provided with an outlet 14 in the upper end thereof which discharges into a separator chamber 16 which may conveniently be a large cylindrical chamber in which the vapors may separate from liquids. The separator chambers 16 may also be provided with scrubbing trays or packing which is adapted to facilitate separation of liquids from gases. The separator discharges into conventional equipment used for the recovery and/or rectification of hydrogen peroxide vapor. Recovery systems are not shown here because they form no part of the present invention.

Separator 16 is also provided at the lower portion thereof with a discharge line 18 which delivers separated hydrogen peroxide liquid solution to a header 20 which communicates with the bottom of vaporizer tube 10 and is disposed a distance appreciably below the point at which heat is applied to tube 10.

Also connected to the header is an open, unobstructed line 30 for supplying hydrogen peroxide feed solution to the header and, further, there is provided a suitable purge line (not shown) for removing hydrogen peroxide solution periodically or continuously from the header.

Line 30 is connected to a reservoir 22. The cross-sectional area of reservoir 22 is substantially in excess of that of tube 10, normally being large enough to hold at least five, and preferably at least nine, times the weight of hydrogen peroxide solution that can be held (at any given level common to the reservoir and the vaporizer) in the vaporizer (including tube 10 and tube 18). The reservoir is disposed at substantially the same level as that of the vaporizer so that a pool of hydrogen peroxide established in the reservoir takes substantially the same level as the level of liquid in the vaporizer. In order to ensure that this occurs, a line 28 is provided to communicate with the upper portion of the vaporizer and also with the vapor space in the separator, for example, through line 14, so that the pressure in the upper portion of the reservoir in the vapor space above the level of the pool of hydrogen peroxide therein is maintained equal or substantially equal to that in the vapor spaces in the vaporizer and the separator.

In the operation of the embodiment illustrated in the drawing, hydrogen peroxide solution is supplied from a feed tank (not shown) to the reservoir through line 24, and a pool of liquid is established therein at a suitable depth, for example, a depth equal to about half the height of the vaporizer. Because line 30 is substantially unobstructed and is free from valves, hydrogen peroxide flows from the reservoir through line 30 into the vaporizer, thereby establishing a level of liquid in the vaporizer (particularly tube 18) substantially equal in height to that in the reservoir. Heat is then applied by passage of steam through the jackets 12, and hydrogen peroxide is caused to vaporize.

As a consequence of this vaporization, a mixture of vapor and hydrogen peroxide solution rises through the tube 10 and is discharged through line 14 into the separator 16, carrying unvaporized liquid therewith. The rate of application of heat is controlled so as to prevent evaporation of more than about 50 percent by weight of the solution. The resulting mixture thus contains at least half of the original mixture in the form of an unvaporized liquid.

The unvaporized liquid is separated in separator 16 and is returned through line 18 to the header 20 from where it is then returned to the vaporizer. Continuously or from time to time, hydrogen peroxide purge is withdrawn from the header 20. Continued heating produces a more or less continuously circulating stream of liquid which flows upwardly through the vaporizer into the separator, returning downwardly to the vaporizer. The concentration of this aqueous solution normally ranges between about 55 to 70 percent by weight of hydrogen peroxide.

The concentration of the hydrogen peroxide feed should be less than 60 percent by weight, preferably in the range of 5 to 35 percent by weight of hydrogen peroxide. The amount of carbonaceous impurities which are present in this material will depend upon its method of manufacture but frequently the total carbon in the hydrogen peroxide will range from 0.2 to 5.0 grams per liter of hydrogen peroxide solution. As a consequence of the removal of vapors which contain less carbonaceous material than does the residual liquid, the concentrated hydrogen peroxide solution circulated through the vaporizer frequently will contain 2 to 25 grams per liter of hydrogen peroxide.

If any stoppage in the feed of hydrogen peroxide to the reservoir through line 24 should occur without knowledge of the operator, vaporization of the hydrogen peroxide will, of course, continue. This simply causes a fall in the level of the hydrogen peroxide in the vaporizer and a consequent fall of the level of hydrogen peroxide in the reservoir 22. However, since the cross-sectional area of the reservoir is large enough to maintain at all times a much larger volume of hydrogen peroxide solution therein than can be maintained in the vaporizer, including line 18, the amount of the more dilute hydrogen peroxide supplied to the vaporizer through line 30 always is large enough at any level to dilute the hydrogen peroxide solution circulating through the vaporizer system below 70 percent by weight. Even though the feed through line 24 decreases or is permanently discontinued, the concentration of the hydrogen peroxide liquid circulating through the vaporizer system is not increased appreciably.

If vaporization is continued, the level falls in the vaporizer and also in the reservoir until at last the level is below the area in the vaporizer which is heated. At this time, vaporization stops. Even before this takes place, however, discharge of liquid in the upper portion of the column through line 14 stops. Slugs of liquid rise up the tube 10 near the outlet into line 14 and then fall back, the vapors proceeding into the separator without substantial liquid. This produces a high degree of surging within the tube 10, pulsations of which are communicated back into header 20 and the pool of reservoir 22. This surging then causes intermixing of the liquid in the vaporizer with the liquid in the reservoir, thus inherently diluting the circulating solution and preventing it from exceeding the explosive concentration.

While this intermixing promotes dilution as described above and has some advantage, it is not absolutely essential to performance of the invention and it is desirable to restrict intermixing at least to a degree. This may be accomplished by making pipe 30 relatively long so that surges in pressure created by brief variations in level of liquid in vaporizer 10 are damped in line 30 and do not reflect an appreciable change in level in the reservoir 22.

Alternatively, an orifice may be provided in line 30, or other damping means may be resorted to. Usually, it is advantageous to have the diameter of line 30 substantially less than that of reservoir 22 since this also decreases back mixing.

The following example is illustrative:

*Example I*

In a typical example, an apparatus of the type illustrated in Figs. 1 and 2 was used. The vaporizer was a tube having an internal diameter of 2 inches and a heated height of 120 inches. The jackets 12 terminated 18½ inches above the bottom of header 20. Tube 10 discharged through a one-inch line 14 which, in turn, discharged tangentially into separator 16 which had an internal diameter of 18 inches which, in its bottom section, was free from packing or other obstruction. Separator 16 tapered to a lower section 6 inches in diameter which fed into a one-inch I.D. pipe 18. Reservoir 22, which had an internal diameter of 4 inches, fed into the header 20 through a 4-inch by 1-inch 90° elbow reducer and line 30 which was a 1-inch I.D. pipe 18 inches long.

In the operation of the apparatus, an aqueous solution containing 15 percent by weight of hydrogen peroxide was fed into the reservoir 22 and the system was evacuated to 125 millimeters of pressure. The steam was introduced into the jacket, the temperature within the vaporizer being maintained at about 160 to 165° F. The solution was fed into the reservoir 22 continuously until circulation through the vaporizer began and the system stabilized at a constant level. Thereafter, the feed through line 24 was discontinued. At the time the feed was discontinued, the hydrogen peroxide concentration in the lower portion of the vaporizer was approximately 60 percent by weight.

Heating was continued by continuing the rate of introduction of steam into jacket 12 at the same rate as before the feed was turned off. Over a period of about 15 minutes, the level of hydrogen peroxide in the vaporizer tube dropped from about 136 inches to 85 inches. During this period, the concentration of hydrogen peroxide in the bottom of the vaporizer rose to 67 percent by weight, the temperature in the vaporizer rose slightly. In the next 15 minutes, the level of the liquid in the vaporizer fell to about 41 inches and the temperature in the bottom of the vaporizer fell to 96.8° F. At the end of 34 minutes, the concentration of hydrogen peroxide in the column fell to 55 percent hydrogen peroxide, due to back mixing with the hydrogen peroxide in the reservoir. In other runs, the hydrogen peroxide concentration fell to as low as 45 percent by weight. Thus, as vaporization took place, the back mixing resulting from the surges produced in the vaporizer caused the hydrogen peroxide solution to become more dilute and thereby establishment of a hydrogen peroxide concentration in an explosive limit was avoided.

Although the present invention has been described with specific reference to the specific details thereof, it is not intended that such details shall be regarded as limitations upon the scope of the invention except insofar as included in the accompanying claims.

What is claimed is:

1. A method of vaporizing hydrogen peroxide which comprises heating aqueous hydrogen peroxide solution in a vaporizer to partially vaporize said solution, discharging a mixture of the resulting vapors and unvaporized hydrogen peroxide solution from the upper portion of said vaporizer while maintaining a body of said solution in a lower portion thereof, delivering said mixture to a separator and separating vapor from unvaporized hydrogen peroxide solution, delivering the unvaporized hydrogen peroxide solution to said body in said vaporizer below the point at which said vapors are formed, delivering hydrogen peroxide feed solution to be vaporized to a reservoir, maintaining the level of said feed solution in said reservoir the same as that in the vaporizer and the weight of feed solution in said reservoir at least 5 times the combined weight of liquid in said body of liquid in said vaporizer.

2. A method of vaporizing hydrogen peroxide which comprises heating aqueous hydrogen peroxide solution in a vaporizer to partially vaporize said solution, discharging a mixture of the resulting vapors and unvaporized hydrogen peroxide solution from the upper portion of said vaporizer while maintaining a body of said solution in a lower portion thereof, delivering said mixture to a separator and separating vapor from unvaporized hydrogen peroxide solution, delivering the unvaporized hydrogen peroxide solution to said body in said vaporizer below the point at which said vapors are formed, delivering hydrogen peroxide feed solution to be vaporized to a reservoir, maintaining the level of said feed solution in said reservoir substantially the same as that in the vaporizer and the weight of feed solution in said reservoir at least 9 times the combined weight of liquid in said body of liquid in said vaporizer.

3. The method of claim 2 wherein the vapor pressure above the level of the solution in the reservoir is maintained substantially the same as that in the vapor space in the vaporizer.

4. A method of vaporizing hydrogen peroxide aqueous solution which comprises establishing a flowing stream of aqueous hydrogen peroxide solution upwardly through a vaporizer into a vapor separator and back into the bottom of the vaporizer, maintaining a body of said solution in the bottom of the vaporizer, heating the stream as it passes through the vaporizer to vaporize up to 50 percent thereof, separating the resulting vapor from the unvaporized liquid in the vaporizer, feeding hydrogen peroxide solution which is more dilute than that retained from the separator to the body of solution in the vaporizer from a reservoir, maintaining the level of the more dilute hydrogen peroxide solution in the reservoir substantially at the level of the body of solution in the vaporizer, and maintaining the weight of hydrogen peroxide solution in said reservoir at least 5 times the weight of hydrogen peroxide solution in the body in the vaporizer.

5. The process of claim 4 wherein the concentration of the hydrogen peroxide in the flowing stream is 55 to 70 percent by weight.

6. A method of vaporizing hydrogen peroxide aqueous solution which comprises establishing a flowing stream of aqueous hydrogen peroxide solution upwardly through a vaporizer into a vapor separator and back into the bottom of the vaporizer, maintaining a body of said solution in the bottom of the vaporizer, heating the stream as it passes through the vaporizer to vaporize up to 50 percent thereof, separating the resulting vapor from the unvaporized liquid in the vaporizer, feeding hydrogen peroxide solution which is more dilute than that retained from the separator to the body of solution in the vaporizer from a reservoir, maintaining the level of the more dilute hydrogen peroxide solution in the reservoir substantially at the level of the body of solution in the vaporizer, and maintaining the weight of hydrogen peroxide solution in said reservoir at least 9 times the weight of hydrogen peroxide solution in the body in the vaporizer.

7. A method of vaporizing hydrogen peroxide which comprises heating a body of liquid aqueous hydrogen peroxide at a point above the bottom of said body and vaporizing hydrogen peroxide therefrom, supplying hydrogen peroxide solution to a lower portion of said body and below the point where said body is so heated from a reservoir in which the liquid level is maintained substantially the same as the liquid level of said body, and maintaining the amount of solution in the reservoir at least 5 times the amount in said body.

8. A process according to claim 7 wherein the pressure in the vapor space above the liquid level in the reservoir is substantially equal to the pressure in the vapor space in the vaporizer.

9. The process according to claim 7 wherein the weight of hydrogen peroxide solution in the reservoir is at least 9 times the weight of hydrogen peroxide in the vaporizer.

10. The process of claim 7 wherein the body of liquid hydrogen peroxide is an aqueous solution containing less than 60 percent by weight of hydrogen peroxide.

11. The process of claim 7 wherein the body of liquid hydrogen peroxide is an aqueous solution containing 5 to 35 percent by weight of hydrogen peroxide.

12. The process of claim 7 wherein the body of liquid hydrogen peroxide is an aqueous solution containing less than 60 percent by weight of hydrogen peroxide and wherein the heating of said body produces a mixture of liquid aqueous hydrogen peroxide and hydrogen peroxide vapor, which mixture is removed from said body.

References Cited in the file of this patent

UNITED STATES PATENTS

| | | |
|---|---|---|
| 2,479,267 | Sandford | Aug. 16, 1949 |
| 2,741,584 | Holmes et al. | Apr. 10, 1956 |